(12) United States Patent
Karem

(10) Patent No.: US 7,887,730 B2
(45) Date of Patent: Feb. 15, 2011

(54) SELF-TOOLING COMPOSITE STRUCTURE

(76) Inventor: Abe Karem, 1018 Timberline La., N. Tustin, CA (US) 92705

( * ) Notice: Subject to any disclaimer, the term of this patent is extended or adjusted under 35 U.S.C. 154(b) by 0 days.

(21) Appl. No.: 12/200,534

(22) Filed: Aug. 28, 2008

(65) Prior Publication Data

US 2009/0072439 A1 Mar. 19, 2009

Related U.S. Application Data

(60) Provisional application No. 60/968,489, filed on Aug. 28, 2007.

(51) Int. Cl.
*B29C 39/12* (2006.01)
*B29C 70/44* (2006.01)
*B29C 39/10* (2006.01)

(52) U.S. Cl. .............. 264/246; 264/242; 264/DIG. 57; 264/DIG. 59

(58) Field of Classification Search ........... 264/242, 264/246, DIG. 57, DIG. 59, DIG. 76
See application file for complete search history.

(56) References Cited

U.S. PATENT DOCUMENTS

| | | | |
|---|---|---|---|
| 3,967,996 A * | 7/1976 | Kamov et al. ........... 156/156 |
| 4,335,182 A | 6/1982 | Brand et al. | |
| 4,565,595 A * | 1/1986 | Whitener ............... 264/258 |
| 5,292,475 A | 3/1994 | Mead et al. | |
| 5,547,629 A * | 8/1996 | Diesen et al. ........... 264/257 |
| 6,638,466 B1 * | 10/2003 | Abbott ................. 264/258 |

FOREIGN PATENT DOCUMENTS

WO 02/091550 11/2002

* cited by examiner

*Primary Examiner*—Yogendra N Gupta
*Assistant Examiner*—Alison Hindenlang
(74) *Attorney, Agent, or Firm*—Fish & Associates, PC

(57) ABSTRACT

Composite structures with internal cavities are constructed with relatively stiff walls that can support additional composite laminate layers, creating a self-tooling structure. The structure is subsequently simulcured, preferably in combination with elevated temperatures or pressures. Preferred structures are long and slender, and are constructed with one or more internal cells. Rotor blades are especially suited to the preferred construction methods. The walls can be advantageously constructed using composite sandwich panels, having an exterior laminate layer. In preferred embodiments, additional composite layers can be added before or after the simulcuring process.

11 Claims, 5 Drawing Sheets

SELF-TOOLING COMPOSITE STRUCTURE

This application claims priority to U.S. Provisional Application Ser. No. 60/968,489 filed Aug. 28, 2007 which is incorporated by reference herein in its entirety.

FIELD OF THE INVENTION

The field of the invention is the manufacture of composite structures.

BACKGROUND

Composite structures, especially structures made of carbon fibers and thermosetting or thermoplastic resin, are gaining rapid acceptance in aircraft primary structure and other applications that require a high strength to weight ratio and/or high stiffness to weight ratio. For example, the main structure of the Boeing™ 787 is reported to be made up of more than 50% carbon-epoxy composites.

Some of the most demanding aircraft structures including wings, propellers, and rotor blades require high strength and high stiffness from long and thin structures, called high aspect ratio structures; these structures are further required to be lightweight. Such structures are well-suited to carbon composite construction. The majority of such aircraft composite structures are manufactured by placing carbon fibers that are pre-impregnated with epoxy resin (pre-preg in the industry vernacular) in molds, and then curing the composites in ovens or pressurized ovens (called autoclaves).

Manufacturing composite structures often requires complex manufacturing tools, with relatively high labor content and other costs. Additionally, when such structures are designed to the minimum required thickness to provide the specified strength and stiffness, the reduced thickness makes the structure prone to buckling instability. Design against buckling requires either increased thickness (entailing higher weight and cost) or additional support through adoption of sandwich construction using a lightweight core material. For most high aspect ratio structures, including helicopter rotor blades, this sandwich construction is impossible or impractical to achieve in the current manufacturing process, as the curing of an enclosed box form at high aspect ratio requires complex tooling or creates inaccessible voids.

Thus, there is still a need for improved methods of producing lightweight, enclosed high aspect ratio composite structures that include resistance against buckling.

SUMMARY OF THE INVENTION

The present invention provides apparatus, systems, and methods in which composite structures with internal cavities are constructed using relatively stiff walls comprising a partially cured first composite layer that can support additional composite laminate layers which are not self-supporting. This creates a self-tooling structure, which is subsequently simulcured to create a desired part.

The internal cavities of preferred structures are bounded by walls advantageously comprising composite panels of sandwich construction. In especially preferred embodiments, these walls are sufficiently stiff to be capable of supporting themselves as well as additional laminate layers before a curing process.

Contemplated structures include those that are long and slender, especially those with one or more internal cells, in which the cavity bounded by the internal cell has an aspect ratio of at least 5, 10, 15, or even 20. Rotor blades are especially preferred structures; they are usually long and relatively thin, and often have demanding structural requirements well suited to multi-cell composite construction.

In preferred embodiments, the structure comprises one or more constituent components such as wall panels and one or more laminate layers that are simulcured together. Contemplated simulcuring processes include exposing the first and additional composite layers to a temperature of at least 80°, 180°, or even 280° C. It is still further contemplated that the simulcuring process could simulcure first and additional composite layers under a pressure of at least 10 psi, 50 psi, or 90 psi above ambient pressure.

The walls bounding the internal cavity of preferred structures comprise at least a first layer of composite material, preferably having a pre-cure thickness of at least 0.1, 0.2, or 0.3 mm. This first layer of composite material may advantageously be a face sheet of a composite sandwich panel, and may further comprise a plurality of fibers with orientations at least 45° normal to the long axis of the object. It is contemplated that a second composite layer could be added to the first, the second layer having a pre-cure thickness of at least at least 0.1, 0.2, or 0.3 mm. It is still further contemplated that a third layer, forth layer, or any number of additional layers may be added to the object before or after the step of simulcuring.

DETAILED DESCRIPTION

The present invention provides apparatus, systems, and methods in which a partially cured composite layer is used as scaffolding for a second layer that is not self-supporting, and the layers are simulcured.

As used herein, "composite" means engineered materials made from two or more constituent materials. Of special relevance are carbon composites, in which carbon fiber is embedded in a matrix or resin. Alternate composites are also contemplated including those containing fiberglass, ceramics, and other elements. A layer of composite material could include a plurality of fibers positioned at an orientation with respect to the long axis of an object. A matrix or resin material could surround said fibers. In certain applications, the plurality of fibers can advantageously be arranged with an orientation at least 45° from a line normal to the long axis of the object.

As used herein, a "laminated object" refers to an object made with laminates. These laminates typically comprise multiple layers or plies of composite with fibers in a resin. Individual layers or plies preferably have a plurality or fibers arranged in a predominantly similar orientation. Different layers in a laminate can have fibers at different angles. However, in some cases, a laminate may comprise only a single layer of material. An "object having a cavity" refers to either an object with boundaries defining an internal void, including tubes, or open sections including channels.

As used herein, "sandwich construction" means a lower density and relatively thicker core between two higher-density and relatively thinner skin layers, sometimes referred to as "face sheets". Preferred sandwich constructions include laminated carbon composite skin layers and honeycomb or foam core.

As used herein, an object that is "self-supporting" can maintain a geometric configuration without the use of external supports. An object that is at least partially not self-supporting requires some external supports, tooling, or scaffolding to maintain a geometric configuration and orientation.

Figure 1:
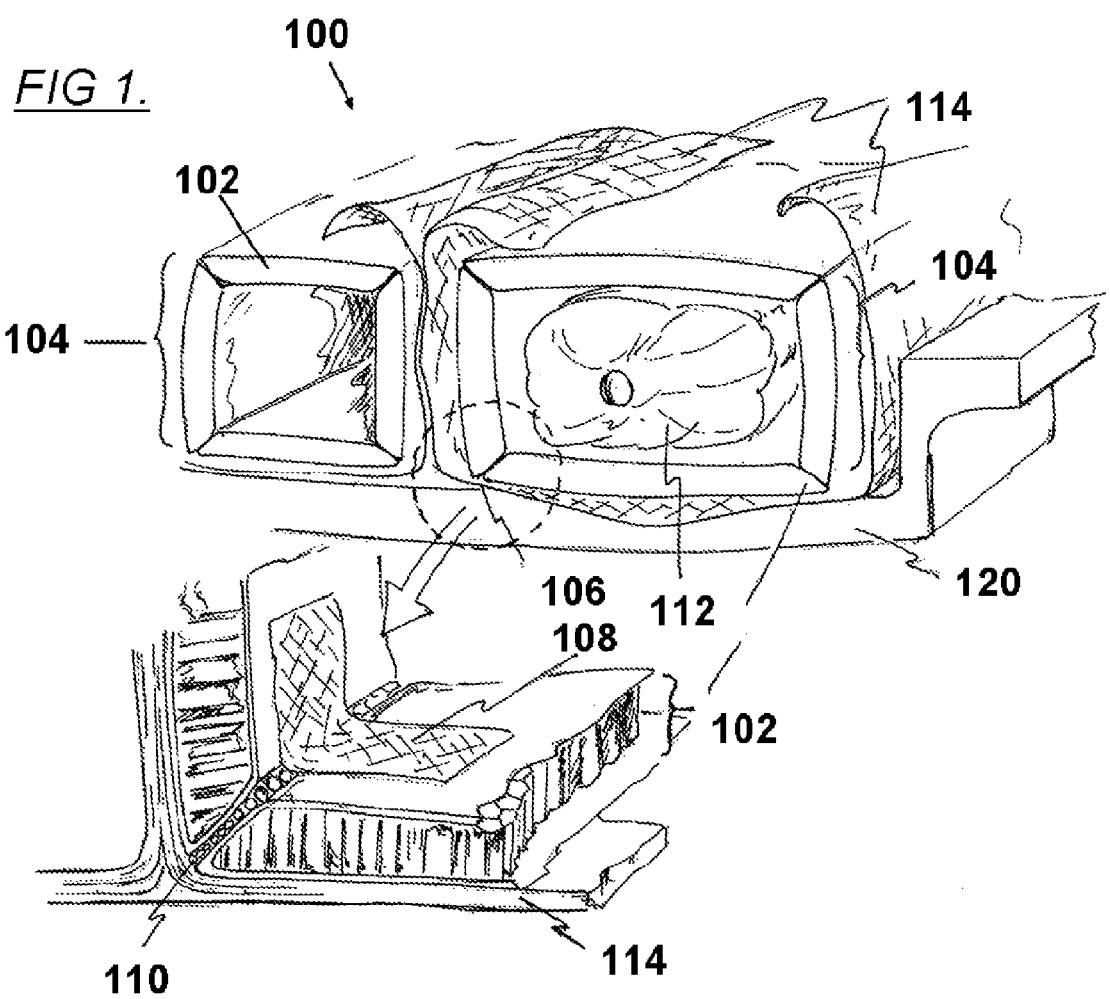
FIG. 1 is an illustration of a preferred self-tooling sandwich structure.

Preferred methods for composite structural construction effectively use a sandwich construction useful for buckling support of minimum thickness laminates as part of the tooling to help manufacturing of the structure. As shown in the exemplary embodiment of FIG. 1, a preferred sandwich structure 100 consists of pre-cured sandwich panels 102 assembled into one or more core boxes 104. The corners 106 of a pre-cured core box 104 are constructed with lower temperature curing tape 108 which allows the core box 104 to flex and expand during an autoclave cure of the part. The panels 102 of the box have an optional heat-activated gap filler 110 in the corners 106. An internal bladder 112 provides pressure to compact the outer laminate 114 and slightly deform the box 104 to conform to the outer laminate 114. This arrangement is set inside a tool 120. At room temperature, the box is considered rigid, with sufficient stiffness to be self-supporting, thus creating a "self tooling" structure. This provides reduced weight, labor and cost for many demanding aircraft structures for which the cross section is a closed structure, and often too small for automated machine to reach. Of particular interest are methods of manufacture for sections with an internal void that is not a straight tapered shape that could easily be formed using an extractable internal mandrel. Such an internal void might have an angled or curved shape.

The methods are especially useful in producing structures that have an external aspect ratio of at least 10 or 15, and most especially where the internal cavity has an aspect ratio of at least 10 or 20, and where the cavity is not linear and therefore the use of an extractable mandrel is difficult or impossible. The aspect ratio of an object is defined as its maximum long dimension divided by its maximum width dimension. Of particular interest is where the object comprises a rotor blade In many contemplated instances, the processing will include simulcuring the sandwich and laminate layers under either a vacuum, high pressure, or both. For example, a vacuum can be applied under the bladder or bag on the laminate, and/or autoclave or other pressure can be applied over the bladder or bag. It is also contemplated that the simulcuring can advantageously take place using a temperature at least 80° C., 100° C., 120° C., 150° C., 200° C., 250° C., or at least 300° C.

As used herein, simulcuring several objects means exposing them to substantially the same curing cycle at substantially the same time. Curing cycles typically comprise controlled levels of temperature and pressure over certain time periods. Simulcuring can be advantageously performed with a pressure differential from ambient pressure. It is contemplated that simulcuring multiple layers could be conducted with a pressure of at least 0, 10, 20, 30, 50, 70, 90, 110, 130 or even 150 pounds-per-square inch (psi) above ambient pressure. These pressures can be applied in combination with vacuum as described above.

An object that goes through a curing process has a thickness before the process, referenced herein as a pre-cure thickness, and a thickness after the curing process, referenced herein as a post-cure thickness. A pre-cure thickness of a laminate might be merely 0.1 mm, 0.2 mm, 0.3 mm, or thicker values including 30 mm, 40 mm, or 50 mm.

To this point, contemplated layers can have any suitable thicknesses, including for example a pre-cure or post-cure thickness of at least 0.1, 0.2, or 0.3 mm laminate and at least 0.5 mm sandwich; or 40 mm laminate and 100 mm sandwich. Third, fourth, or other layers can be added to the first and second layers before or after the step of simulcuring. Thus, a preferred composite sandwich panel might comprise 2 mm, 4 mm, or more of core material surrounded by a first composite layer on either side of the core material, the first composite layer having a thickness of 0.1 mm, 0.3 mm, or more. A second, third, or fourth composite layer may be added onto the first composite layer, increasing the thickness of the assembly. The second, third, or fourth layers need not be self-supporting, as the wall including the first composite layer can be advantageously used as support tooling.

All suitable fibers and matrices are contemplated, including all suitable fiber arrangements, although the fibers of the sandwich (supporting) layer can be oriented orthogonal to the laminate layer or at any bias angle (including angles between 10-80 degrees) to the laminate layer. Unless the context dictates the contrary, all ranges set forth herein should be interpreted as being inclusive of their endpoints, and open-ended ranges should be interpreted to include only commercially practical values.

Figure 2:
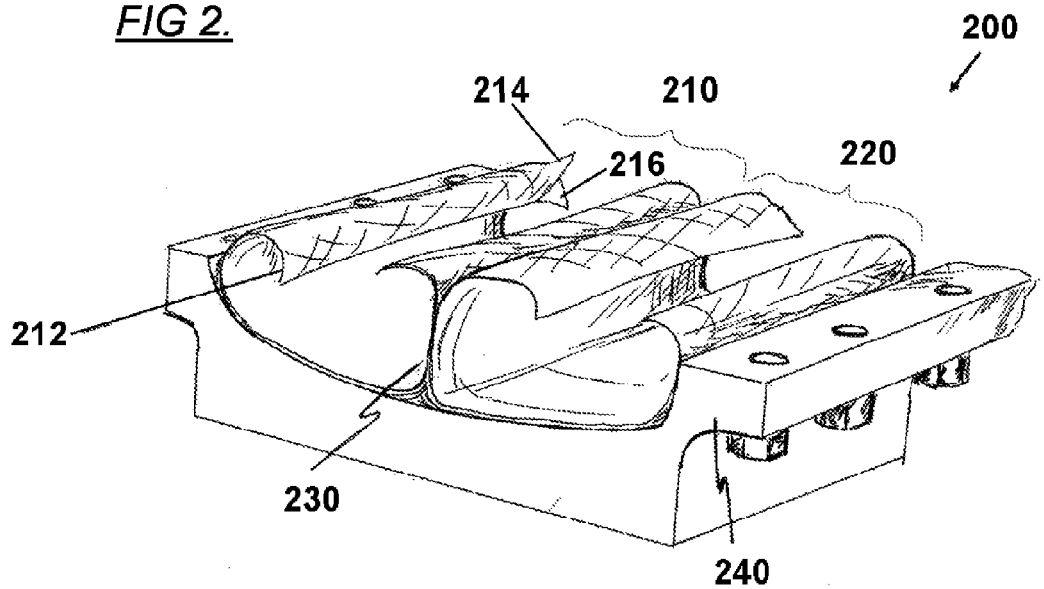
FIG. 2 depicts an initial stage in the construction of a preferred multi-cell structure.
Figure 3:
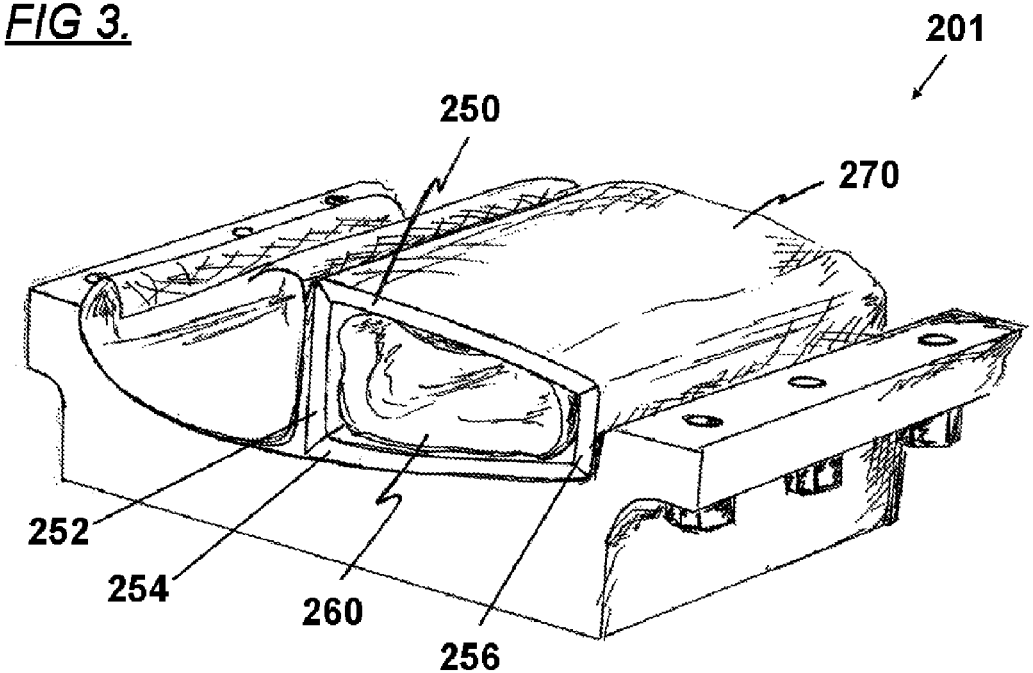
FIG. 3 shows a later stage in the construction of a preferred multi-cell structure, including the insertion of a bladder in a cell.
Figure 4:
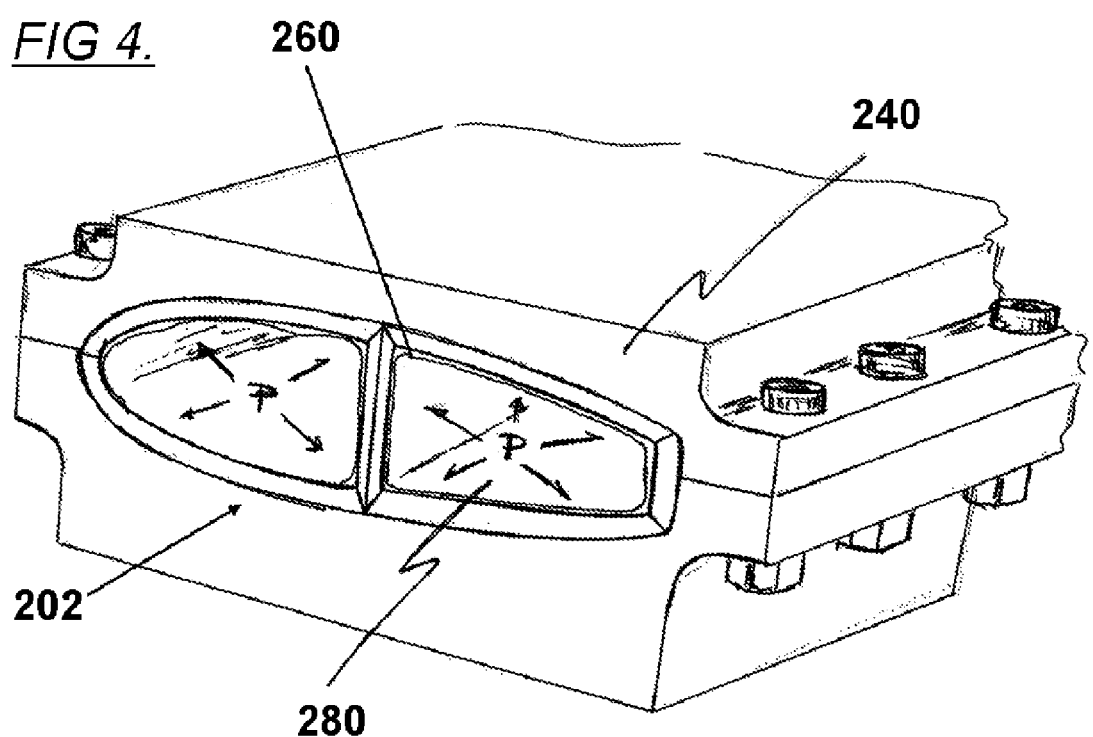
FIG. 4 illustrates a still later stage in the construction of a preferred multi-cell structure, with the structure enclosed in a tool.

An especially preferred process of manufacture of a composite laminate structure is illustrated in FIGS. 2-4. In FIG. 2, a structure 200 such as rotor blade or wing spar having multiple-cells 210, 220 is formed by laying in a first pre-pregged laminate 212 consisting of one or several plies 214, 216 in a combination of directions advantageous for the design of the structure. Each cell 210, 220 of the structure is preferably layed-up individually, with the adjacent plies on walls 230 coming together. In a preferred embodiment, the laminate is applied in a tool 240 that will be pressurized and cured at high temperature. In FIG. 3, a later stage in a preferred method is shown for a rotor blade section structure 201. The internal cavities in the cells of the blade are by inserting a self tooling, pre-cured layer of panels 250, 252, 254, 256, which comprise pre-cured honeycomb or other core materials. Each cell box has a pre-installed flexible bladder 260 inside. An enclosing laminate layer 270 is applied over the supporting pre-cured panel layer 250, which allows the manufacturer to stack remaining laminate layers. FIG. 4 depicts a later stage in the process. The structure 202 is subsequently enclosed in the tool 240 and internal bladders 260 and/or an autoclave apply heat and pressure to the assembly for curing. The thin wall bladders 260 are preferably extracted after the curing process. Alternatively, however, such bladders could be left in the structure, and possibly used for another purpose, such as storing fuel.

Figure 5:
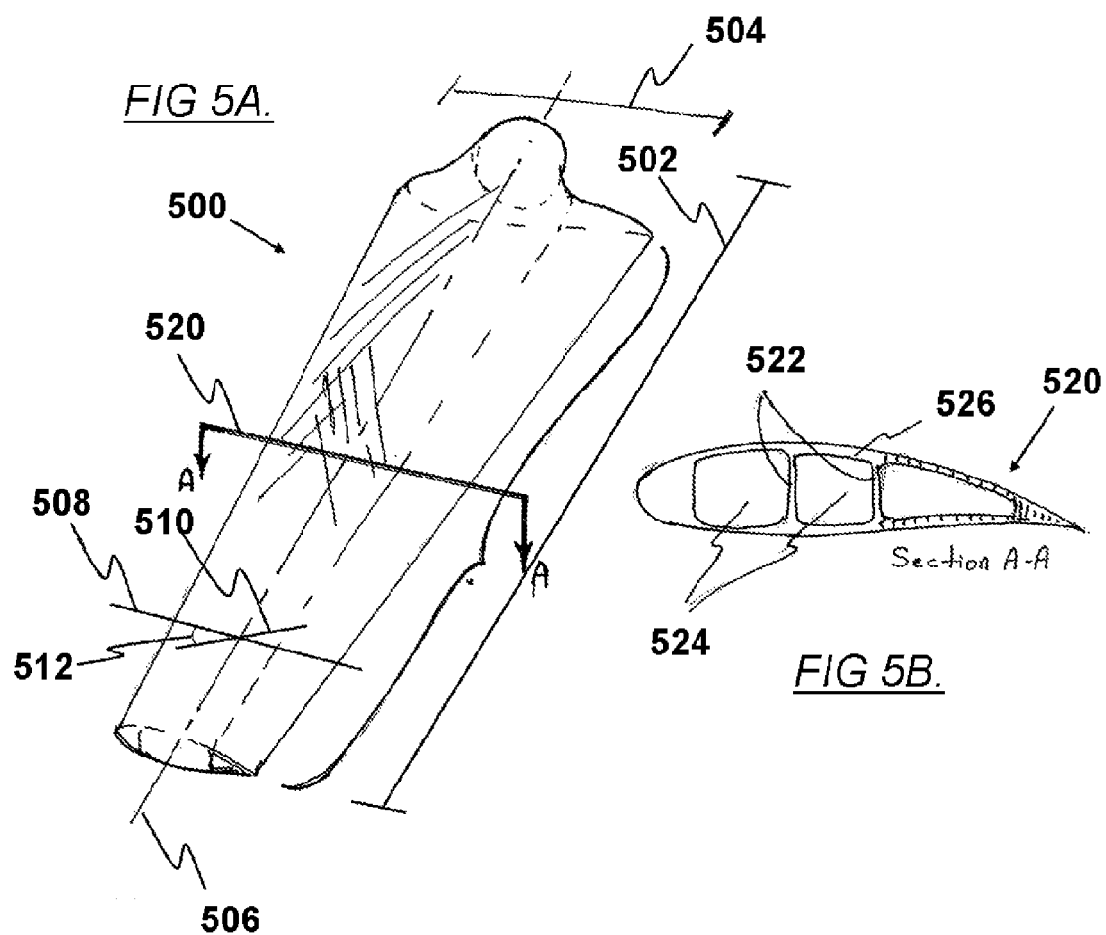
FIG. 5A is an illustration of a completed preferred rotor blade structure.
FIG. 5B is a sectional view of a preferred rotor blade structure.

FIG. 5A illustrates a completed laminated rotor blade structure 500 created using preferred methods. The blade 500 has a length 502 and width 504, such that its aspect ratio is the ratio of these two dimensions. The blade 500 has a long axis 506 such that an imaginary line 508 can be constructed normal to the long axis 506. A fiber 510 in one of the laminates making up the blade 500 has an orientation angle 512 with respect to the line 508 normal to the long axis 506 of the object 500. By examining a cross-section 520 of the blade 500, as shown in FIG. 5B, several additional features may be observed. The blade cross-section 520 exhibits walls 522 at the boundaries of cavities 524, with other composite material 526 for structural support.

Figure 6:
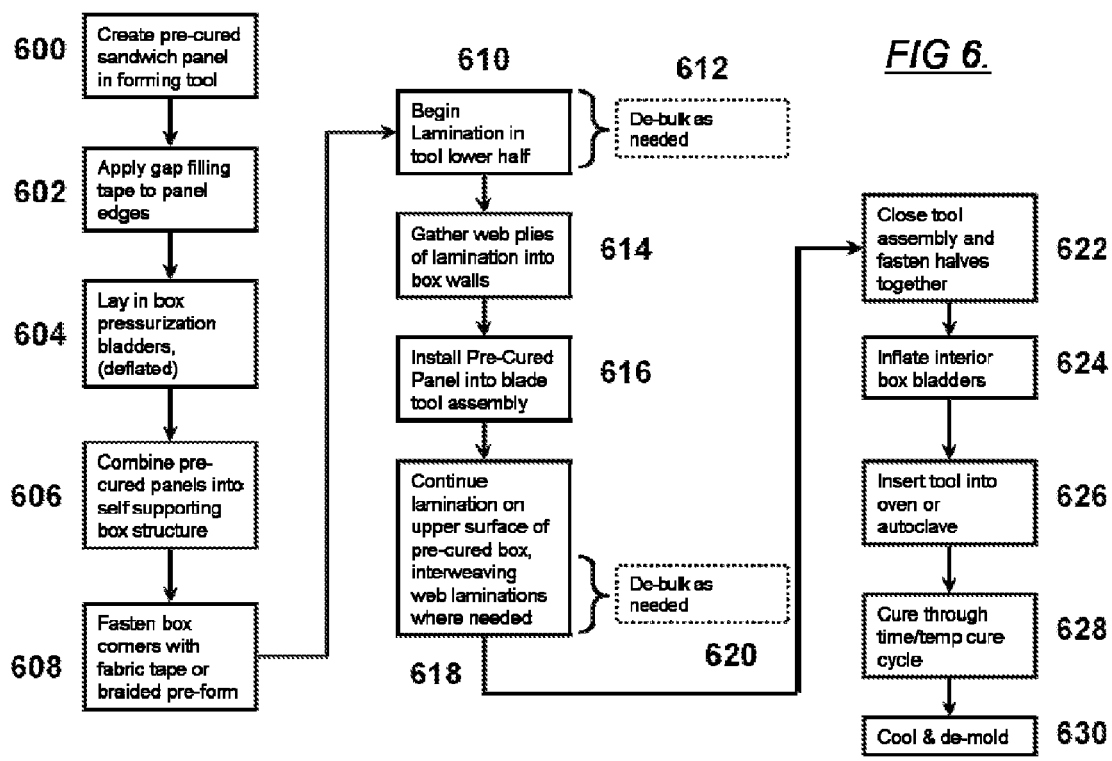
FIG. 6 is a schematic illustration of steps in a preferred composite manufacturing process.

A preferred composite manufacturing process is illustrated schematically in FIG. 6. In step 600, a plurality of pre-cured sandwich panels are created in a forming tool. These are placed in an arrangement having a cavity, including a rectangular box. A gap-filling tape is then applied to the panel edges in step 602. Subsequently, in step 604, deflated bladders are inserted into the cavities. The pre-cured panels are then assembled in step 606 into a self-supporting structure with the aid of fabric tape or braided pre-form applied to the box corners in step 608. In step 610, some laminate is placed in the lower portion of an assembly tool. The composite material can be de-bulked as needed, in optional step 612. Web plies of the laminate are gathered together to form box walls in step 614. In step 616, the pre-cured panels assembled into a self-supporting structure are installed into the tool and laminate assembly. More laminate is applied in step 618, and web laminations are inter-woven as needed. Again, the composite material can be de-bulked at step 620 in the process. Next, the tool assembly is closed and fastened in step 622. The bladders are inflated by means of a pumping device in step 624. The pressure in the bladders is raised to an appropriate level. The entire tool and structure is then inserted into an oven or autoclave in step 626. In step 628 the pressure and temperature of the oven or autoclave is controlled to achieve the desired cure cycle. The structure is then cooled and removed from the mold in step 630.

Thus, specific embodiments and applications of a self-tooling composite structure have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of producing a laminated object having an elongated core box that defines a cavity, comprising:
    producing first, second, third, and fourth partially cured composite self-supporting sandwich panels, each of the panels having two long edges, and each of the panels comprising at least 2 mm of core material surrounded by a composite face sheet having at least a thickness of 0.1 mm;
    joining the first, second, third and fourth panels such that the long edges of the panels form the four corners of the elongated core box;
    using the elongated box as a scaffold to add a composite layer that is at least partially not self-supporting; and
    simulcuring the box and the composite layers.

2. The method of claim 1, wherein the cavity has an aspect ratio of at least 10.

3. The method of claim 1, wherein the object comprises a rotor blade, the blade further comprising second and third longitudinally extending internal cells constructed in a manner similar to the elongated core box.

4. The method of claim 1, wherein the step of simulcuring comprises simulcuring the box and the composite layer under a pressure at least 10 psi (pounds-per-square inch) above ambient pressure.

5. The method of claim 1, wherein the step of simulcuring comprises simulcuring the box and the composite layer using a temperature at least 80° C.

6. The method of claim 1, wherein each of the first, second, third and fourth panels has an area that includes a plurality of fibers positioned at least 45° normal to the long axis of the object.

7. The method of claim 3, wherein a non self-supporting, enclosing laminate layer is applied over all of the second and third longitudinally extending internal cells, and the elongated core box.

8. The method of claim 1, further comprising adding a third or more non self-supporting layers to the object after the step of simulcuring.

9. The method of claim 8, further comprising simulcuring the third or more non self-supporting layers along with the first and second layers.

10. The method of claim 1, further comprising using a bladder inside the core box during the step of simulcuring, and later using the bladder to store fuel.

11. The method of claim 1, wherein the core box has four corners, and further comprising applying tape the corners to assist in joining the first, second, third, and fourth panels.

\* \* \* \* \*